Feb. 26, 1952 R. F. EDGAR 2,587,299
ADJUSTABLE PERMANENT MAGNET ASSEMBLY
Filed Aug. 31, 1949 2 SHEETS—SHEET 1
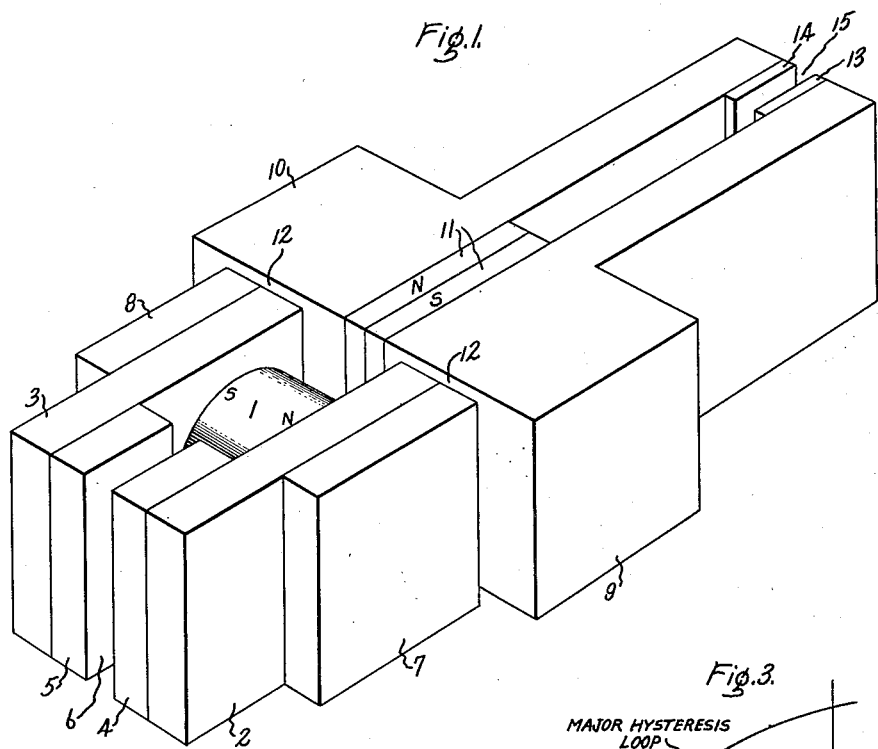
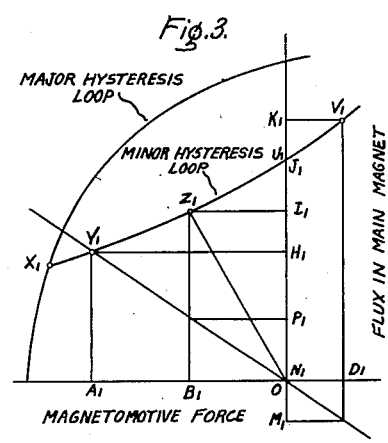
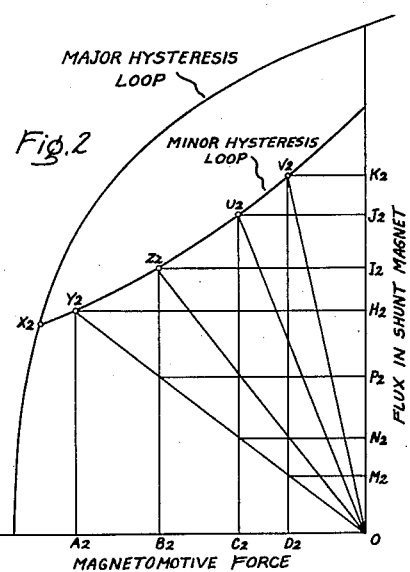
Inventor:
Robert F. Edgar,
by Paul G. Frank
His Attorney.

Feb. 26, 1952  R. F. EDGAR  2,587,299
ADJUSTABLE PERMANENT MAGNET ASSEMBLY
Filed Aug. 31, 1949  2 SHEETS—SHEET 2
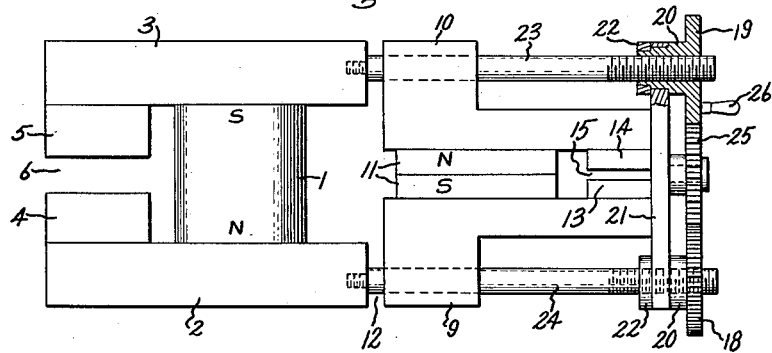
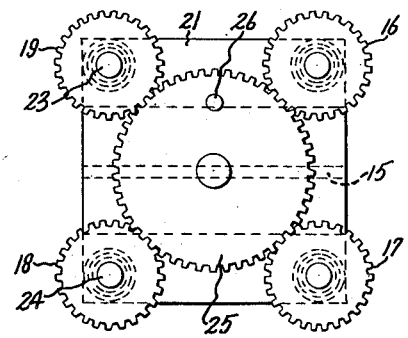
Inventor:
Robert F. Edgar,
by Paul A. Frank
His Attorney.

Patented Feb. 26, 1952

2,587,299

UNITED STATES PATENT OFFICE 2,587,299

ADJUSTABLE PERMANENT MAGNET ASSEMBLY

Robert F. Edgar, Schenectady, N. Y., assignor to General Electric Company, a corporation of New York Application August 31, 1949, Serial No. 113,415

3 Claims. (Cl. 175—21)

My invention relates to improvements in permanent magnet structure, and in particular, to arrangements for varying the field strength of a permanent magnet structure.

The superiority of permanent magnets to electromagnets in many applications results from the fact that the field of the permanent magnet remains constant for any given setting and does not require a power supply. In many of their uses electromagnets must be constructed with low loss so they may be supplied with power from electronic circuits, and elaborate regulating circuits or regulating devices must be employed to maintain a constant field strength.

To obtain the advantages of permanent magnets, where a variable field is required, use has been made of a soft iron shunt which may be moved toward or away from the field poles. This movement is commonly obtained by the use of shims or movable mountings. The shunt serves to by-pass the flux between the poles of the permanent magnet, reducing the flux in the working airgap. As the shunt is moved away from the pole pieces, the length of the variable airgap is increased, and consequently, the reluctance of the path through the shunt is increased. This results in by-passing fewer flux lines and increases the flux across the working airgap. As the shunt is moved closer to the pole pieces, the reluctance of the shunt path becomes smaller resulting in an increase in the number of lines by-passed, and decreasing the effective flux across the working airgap. It has been found, however, that the reluctance of the small airgap between the soft iron shunt and the pole pieces, even though they are in contact, together with the reluctance of the soft iron shunt, prevents the reduction of the working airgap flux below a minimum value. The minimum value so obtainable depends on the contact area between the shunt and pole pieces and on the dimensions of the shunt. In particular applications, where low flux densities are required, a very massive shunt and a large contact area are necessary to reduce the working airgap flux to the desired density.

It is an object of the present invention to provide an improved shunt which eliminates the use of a massive shunt and large contact area.

Another object of the invention is to provide an arrangement for compensating for the drop in magnetomotive force across the small airgap between a soft iron shunt and the pole pieces of a main magnet.

It is a further object of the invention to provide a shunt which reduces the flux density in the working airgap of a magnet to a zero or negative value.

Other objects and advantages of the invention will be apparent during the course of the following description.

In carrying out the invention in one form thereof, I provide a shunt which is composed of a magnetizable substance having high coercive force and a high energy factor. This permanent magnet material is inserted between two soft iron pieces, making a composite structure having soft iron poles separated by a plate of permanent magnet material. The plate is magnetized in the same direction as the shunt flux, and the magnetomotive force of this plate counteracts the drop in magnetomotive force of both the shunt and the airgaps between the shunt and magnet. When the magnet and the shunt are in contact, the magnetomotive force of the shunt may be made equal to, or more than, the combined magnetomotive force drops occurring in the shunt and across the airgaps between shunt and magnet. As the magnetomotive force of the shunt is increased to compensate for the combined magnetomotive force drops, the working airgap flux decreases to a zero value. As the magnetomotive force is further increased, the flux across the working airgap reverses in direction. In this way, the flux density of the working airgap may be reduced through zero to a negative value.

My invention will be better understood from the following description taken in connection with the accompanying drawing in which Fig. 1 illustrates a permanent magnet utilizing the shunt of my invention. Fig. 2 and Fig. 3 show the operating portions of the hysteresis loops of the shunt magnet and main magnet, respectively. Fig. 4 is a top view, partly in section, of a means for adjusting the variable airgap between the shunt assembly and permanent magnet assembly and Fig. 5 is an end view of the structure shown in Fig. 4.

Referring to Fig. 1, the composite permanent magnet and shunt unit illustrated includes a main magnet having a cylinder 1 of permanent magnet material, preferably of the aluminum-nickel-cobalt type. Cylinder 1 is magnetized in an electromagnet to give it initial energy. Soft iron pole pieces 2, 3 are cemented to the ends of the cylinder to form the main magnet. The pole pieces 2, 3 are affixed to the cylinder 1 near their ends, and extend outward on a line perpendicular to the axis of the cylinder 1. Edges of the two pole pieces 2, 3 are mutually perpendicular and extend in the same direction from the axis of the cylinder 1. To the extended ends of the pole pieces are cemented two pole tips 4, 5. The area between the faces of these two pole tips 4, 5 is referred to as the working airgap 6. It is this airgap in which the flux density must be varied by means of the shunt to be described later. Flat iron plates 7, 8 are cemented over the outside of the pole pieces 2, 3 to provide greater area for the flux coming out of the cylinder 1 and also to provide a greater contact area with the shunt pole pieces 9, 10.

My improved shunt structure comprises two soft iron bars 9, 10, separated by one or more thin plates 11 of a permanent magnet material having high energy per unit volume. The plate or plates 11 are magnetized so the plate supplied flux will aid the main magnet flux in a variable airgap 12. The plate or plates 11 should be of sufficient area to carry the entire shunt flux at a density which permits the shunt magnet to exert the desired magnetomotive force on the circuit. This requires slightly greater cross sectional area than that of the main magnet, but the thickness need be only a small fraction of the length of the main magnet. Since magnetomotive force is a function of length, the main magnet must be long enough to provide magnetomotive force for the working airgap, but the shunt-magnet need be only long enough to carry the same flux across the variable airgap 12 when the shunt is in contact or close proximity to the main magnet. By making this plate of the right thickness, it is possible to reduce the working airgap flux completely to zero. Soft iron tips 13, 14 are placed on the inner side of the end of each bar 9, 10. These tips 13, 14 decrease the reluctance of the shunt airgap 15 created between the ends of the two bars, and decreases the demagnetization effect on the shunt magnet 11 as the shunt assembly is moved away from the pole pieces. This shunt airgap 15 forms a magnetic path in parallel with the circuit through the variable airgap 12 and main magnet assembly. Inasmuch as its reluctance is several times greater than that of the main magnet and variable airgap circuit, it by-passes only a small part of the flux supplied by the shunt magnet 11. On the other hand, when the reluctance of the variable airgap 12 is increased to many times that of the shunt airgap 15, which occurs when the shunt is moved away from the magnet pole pieces 2, 3, the shunt airgap 15 provides a by-pass for the flux of the shunt magnet 11 so the flux density in the shunt magnet 11 does not decrease to a value which would have a marked demagnetization effect. The demagnetization principle explained herein is more fully explained in my U. S. Patent No. 2,269,149, granted January 6, 1942, and assigned to the assignee of the present invention.

Fig. 4 and Fig. 5 illustrate a means for adjusting the working airgap 12. The four outer gears 16, 17, 18, 19 are restrained from axial movement by being mounted on sleeves, such as 20, illustrated in the sectional portion of Fig. 4, which extend through the non-magnetic bearing plate 21 and have collars, such as 22, on the end of extending portion thereof. The sleeves are threaded to cooperate with non-magnetic threaded pieces 23, 24 attached to the permanent magnet assembly through pole pieces 9, 10. The four outer gears 16, 17, 18, 19 are operated by a center gear 25, having a handle 26 thereon, in such manner that the shunt assembly is moved toward or away from the permanent magnet assembly. It should be pointed out that with this adjusting mechanism, the shunt assembly may be brought into contact with the permanent magnet assembly, thereby reducing the variable airgap 12 to zero.

In order better to explain my invention, I refer to Fig. 2 and Fig. 3, representing the operating portions of the major and minor hysteresis loops of the shunt magnet and main magnet, respectively, the abscissas representing the total external magnetomotive force developed by the magnets and the ordinates representing the total flux in the magnets.

When the variable airgap 12 is large, the lines $OY_1$ and $OY_2$ represent the reluctance of the working airgap 6 and the shunt airgap 15, respectively, together with the leakage flux paths in parallel therewith. Any point on these lines represents a particularly associated value of magnetomotive force and total flux which will exist together.

Assume that the magnets have both been magnetized to saturation, demagnetized to the points $X_1$ and $X_2$, and then remagnetized to points $Y_1$ and $Y_2$. The total flux in each magnet is $OH_1$ and $OH_2$, represented by points $Y_1$ and $Y_2$ lying on the minor hysteresis loops, which originate on the major hysteresis loops at $X_1$ and $X_2$ and intersect $OY_1$ and $OY_2$ at $Y_1$ and $Y_2$. $OH_1$ represents the sum of the flux in the working airgap 6 and associated leakage flux paths. $OH_2$ represents the sum total of the flux in the shunt airgap 15 and its associated leakage flux paths. $OA_2$ represents the magnetomotive force exerted by the shunt magnet 11 on the shunt airgap 15, and $OA_1$ represents the magnetomotive force exerted by the main magnet 1 on the working airgap 6.

As the variable airgap 12 is decreased, part of the flux supplied by the main magnet passes through the shunt assembly and a part of the shunt-supplied flux passes through the main magnet assembly. The total flux in the shunt magnet 11 is represented by $OI_2$ and the point $Z_2$. In like manner, the total flux in the main magnet 1 is represented by $OI_1$ and $Z_1$. The magnetomotive force exerted by the main magnet is now $OB_1$, which is less than $OA_1$, thus reducing flux in the working airgap 6. The working airgap flux is now $OP_1$ instead of $OH_1$, and the remainder of the total flux $P_1I_1$ has been by-passed through the shunt assembly. In like manner, the shunt airgap flux has been reduced to $OP_2$ and the remainder of the total flux $P_2I_2$ is supplied by the main magnet, $P_2I_2$ being equal to $P_1I_1$. The effective magnetomotive force across the variable airgap 12 is the sum of that exerted by the two magnets and is equal to $OB_2$ plus $OB_1$.

As the variable airgap 12 is reduced still farther, the operating points move along the minor hysteresis loops to positions $U_1$, $U_2$, $V_1$, $V_2$, etc. The dimensions of the magnets are so proportioned that the operating point moves farther on the hysteresis loop of the main magnet 1 than on the hysteresis loop of the shunt magnet 11, thus, point $U_1$ is on the vertical axis while $U_2$ remains to the left of the vertical axis. At this point, the magnetomotive force exexted by the main magnet is reduced to zero, and the entire working airgap flux $OJ_1$ is by-passed through the shunt assembly. The magnetomotive force exerted by the shunt magnet is $OC_2$ and the total flux in the shunt magnet 11 is $OJ_2$. The flux in the shunt airgap is $ON_2$ and the remainder of the total shunt flux $N_2J_2$ is supplied by the main magnet 1, $N_2J_2$ being equal to $OJ_1$ or $N_1J_1$. The magnetomotive force acting across the variable airgap 12 is the sum of the magnetomotive forces exerted by both magnets, but since the magnetomotive force of the main magnet 1 is zero, the total magnetomotive force acting on the variable airgap 12 is $OC_2$. The shunt magnet is now supplying all the magnetomotive force required to divert all the main magnet flux from the working airgap 6.

By still further reducing the variable airgap 12, the operating points are shifted to $V_1$ and $V_2$. The total flux of the main magnet 1 is increased to $OK_1$ but the magnetomotive force of the main magnet 1 is reversed to $OD_1$. The flux in the working airgap 6 has been reversed to $OM_1$ and the total flux $M_1K_1$ comes from the shunt magnet. The magnetomotive force $OD_2$ is exerted by the shunt magnet and the difference between $OD_2$ and $OD_1$ is the magnetomotive force exerted across the variable airgap 12. $OM_2$ represents the flux in the shunt airgap 15 and $M_2K_2$, the flux going through the main magnet 1 and working airgap 6, $M_2K_2$ being equal to $M_1K_1$.

Where a soft iron shunt is employed, the operating point can only be brought as far to the right as some point like $Z_1$ where $OP_1$ is the minimum working airgap flux and $P_1I_1$ is the flux by-passed through the soft iron shunt. $OB_1$ represents the magnetomotive force required to divert the flux $P_1I_1$ across the variable airgap 12, and it is also acting across the working airgap 6 to maintain the flux $OP_1$.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A permanent magnet and shunt assembly comprising a permanent magnet having a core of magnetized material, a first pair of pole pieces extending from the poles of opposite polarity of said permanent magnet with the extremities of such extensions separated from each other by a working airgap, a shunt assembly comprising a magnetized plate interposed between a second pair of pole pieces and separated from said first pair of pole pieces by a variable airgap, said second pair of pole pieces being reciprocally movable with respect to said first pair of pole pieces to provide the variable air-gap, and said plate being magnetized in a direction to form through its pole pieces a series magnetic loop circuit with said magnetized core and said variable airgap in which the fluxes supplied by said magnetized plate and said magnetized core are in the same direction, and a means for adjusting the position of said second pair of pole pieces relative to said first pair of pole pieces whereby the effective length of said variable air-gap can be varied.

2. A permanent magnet and shunt assembly comprising a permanent magnet having a core of magnetized material, a first pair of pole pieces extending from the poles of opposite polarity of said permanent magnet with the extremities of such extensions separated from each other by a working airgap, a shunt assembly comprising a magnetized plate interposed between a second pair of pole pieces and separated from said first pair of pole pieces by a variable airgap, said second pair of pole pieces being reciprocally movable with respect to said first pair of pole pieces to provide the variable air gap, and said plate being magnetized in a direction to form through its pole pieces a series magnetic loop circuit with said magnetized core and said variable airgap in which the fluxes supplied by said magnetized plate and said magnetized core are in the same direction, the flux of said magnetic plate being of sufficient magnitude to reduce the flux in said working airgap to zero when said variable airgap is small, and a means for adjusting the position of said second pair of pole pieces whereby the effective length of said variable air-gap can be varied to adjust the value of the magnetomotive force appearing across said working air-gap over a continuous range extending from a maximum in one direction through zero.

3. A permanent magnet assembly having a main permanent magnet and a main flux circuit supplied thereby including soft iron pole piece extensions from the poles of opposite polarity of said main permanent magnet with the extremities of such extensions separated from each other by a working airgap, and means for varying the magnitude of the flux crossing said working airgap comprising a second permanent magnet having soft iron pole piece extensions magnetically coupled in adjustable flux shunting relation with respect to said main permanent magnet, the polarity of said second permanent magnet being such as to assist such flux shunting, and means for varying the reluctance of the magnetic coupling between said two permanent magnets, said second permanent magnet shunting current having sufficient capacity and permanent magnet energy to reduce the flux crossing said working gap to zero when the reluctance of said coupling is reduced to a minimum value, and a high constant reluctance magnetic shunt circuit across said second permanent magnet to prevent its demagnetization when the reluctance of said magnetic coupling is a maximum.

ROBERT F. EDGAR.

REFERENCES CITED

The following references are of record in the file of this patent:

UNITED STATES PATENTS

| Number | Name | Date |
|---|---|---|
| 2,117,132 | Baermann | May 10, 1938 |
| 2,268,011 | Beechlyn | Dec. 30, 1941 |
| 2,435,735 | Briggs | Feb. 10, 1948 |